March 17, 1953        H. F. HOWARD        2,631,839
CLOTHES SCALE FOR WASHING MACHINES
Filed Nov. 15, 1949        2 SHEETS—SHEET 1
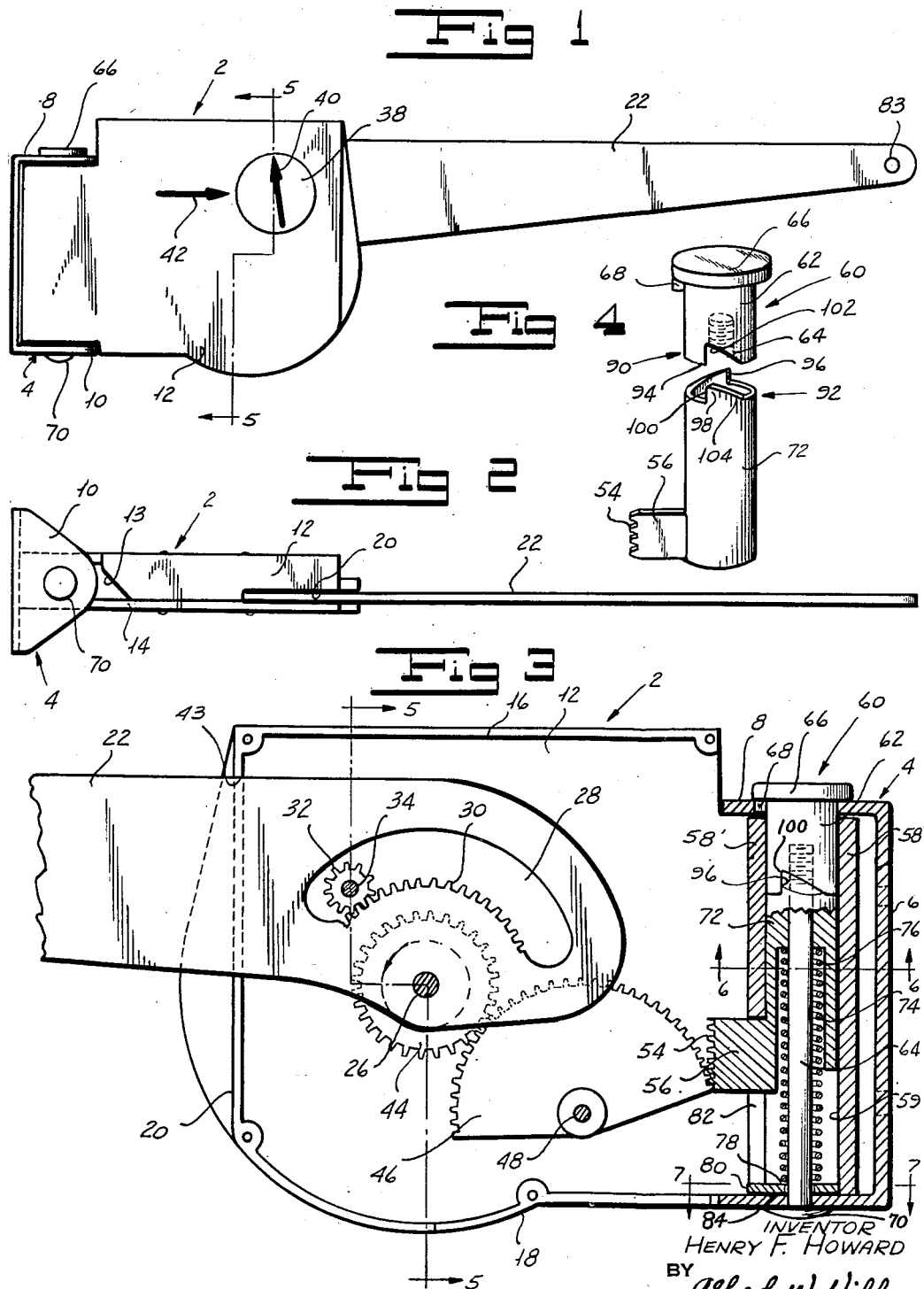
INVENTOR
HENRY F. HOWARD
BY Alfred W. Vibber
ATTORNEY March 17, 1953     H. F. HOWARD     2,631,839
CLOTHES SCALE FOR WASHING MACHINES Filed Nov. 15, 1949     2 SHEETS—SHEET 2

INVENTOR
HENRY F. HOWARD
BY
Alfred W. Nibbe
ATTORNEY

Patented Mar. 17, 1953

2,631,839

UNITED STATES PATENT OFFICE 2,631,839

CLOTHES SCALE FOR WASHING MACHINES

Henry F. Howard, Paterson, N. J., assignor of one-fourth to Alfred W. Vibber, and five per cent to John Gemmink, both of Paterson, N. J.

Application November 15, 1949, Serial No. 127,409

5 Claims. (Cl. 265—68)

This invention relates to a weighing device or scale, such device being particularly adapted for mounting on a washing machine, whereby the operator may weigh the clothes going into the machine and may thus be assured of not overloading such machine.

Modern washing machines for use in the home are designed to take certain maximum loadings. If such maximum loading for a particular machine is exceeded, the clothes in such batch will usually be washed inadequately, due to the fact that the washing machine will not, when thus overloaded operate in its most efficient manner. With some types of washing machines, such overloading also introduces the possibility of stalling the driving mechanism and thereby injuring the machine or ruining it. With washing machines of the centrifugal type, such as the "Bendix" and the "Westinghouse Laundromat," overloading of such machines leads to their serious unbalance and is liable to injure the suspension mechanism for the clothing containing drum.

It is accordingly among the general objects of the invention to provide a scale, particularly adapted for application to washing machines, so that the operator may be assured that he is not overloading the machine.

More particularly the invention is directed to the provision of a scale, particularly adapted for weighing clothes, of novel and improved construction.

Yet a further object of the invention resides in the provision of a scale of the type indicated which is particularly adapted and designed for mounting upon a washing machine, the scale being of such construction that it is readily calibrated for any particular maximum load over an appreciable range, and also such that it will quickly and accurately show when such maximum load is reached.

A still further object of the invention resides in the provision, in the scale of the invention, of means whereby the scale may be swung to an inoperative position, the preferred illustrative embodiment of the scale combining with such pivoting support means automatically to pivot the clothes scale lever vertically downwardly to a retracted, inoperative, position.

These and further objects of the invention will be more readily apparent in the following description of a preferred embodiment of the scale of the invention.

In the accompanying drawings forming a part of the specification:

Fig. 1 is a view in side elevation of a preferred embodiment of the clothes scale of the invention;

Fig. 2 is a view in bottom plan of the scale of Fig. 1;

Fig. 3 is a fragmentary view in side elevation of the clothes scale from the side opposite that shown in Fig. 1, the cover plate of the main housing portion being removed;

Fig. 4 is a view in perspective of a fragment of the pivot pin and of the spring pressed plunger of the apparatus;

Figure 5:
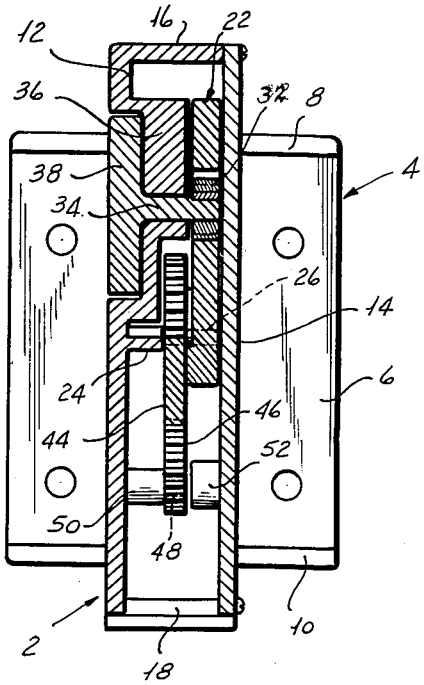
Fig. 5 is a view in vertical section through the main housing portion of the scale, the section being taken along the line 5—5 in Figs. 1 and 3.
Figure 6:
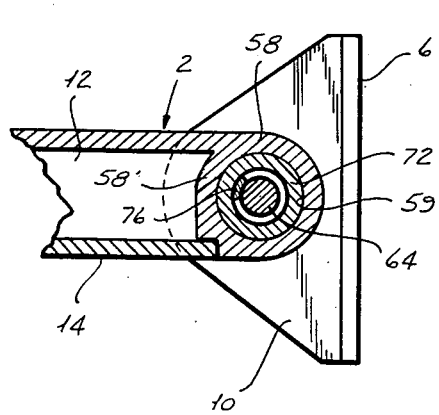
Fig. 6 is a view in horizontal section through the rear pivot portion of the scale, the section being taken along the line 6—6 in Fig. 3.
Figure 7:
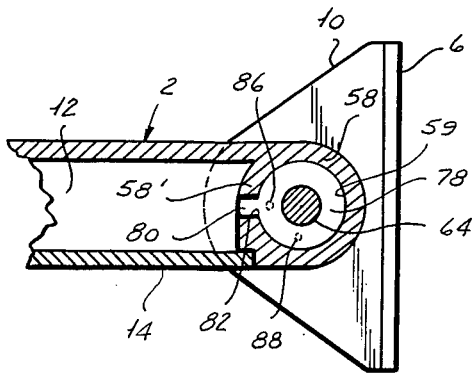
Fig. 7 is a similar view in horizontal section through the rear end of the housing of the scale, the section being taken along the line 7—7 in Fig. 3.

In the preferred embodiment of the clothes scale shown, there is provided a main housing for such scale, such main housing being generally designated by the reference character 2. Main housing 2 is adapted to be supported in a vertical plane and is adapted to be pivoted about a vertical axis, being supported for such pivotal motion by means of the bracket generally designated 4. The rear main portion of the bracket, designated 6, is flat in this instance, being adapted to be attached to a flat wall surface of a washing machine by means of bolts or screws extending through the holes shown in portion 6. It will be appreciated that, if the clothes scale is to be applied to a washing machine with a curved wall or tub, the portion 6 of the bracket will be curved so as to be complementary to such surface of the machine. If the bracket is to be mounted directly on the tub of the washing machine, a sealing gasket will be interposed between part 6 of the bracket and the tub. Bracket 4 has an upper horizontal arm 8 and a lower horizontal arm 10, between which the rear end portion of housing 2 is located.

Housing 2 is composed of a main body portion 12 of shallow box-like construction, portion 12 being preferably formed as an integral die-casting. Portion 12 of the housing serves as the main support for the scale lever and for the various driving and indicating gears, shafts, etc., to be described. Portion 12 is provided with a top horizontal flange portion 16 and a bottom flange portion 18, shown more clearly in Fig. 3, there being a slot 20 through the flange portion on part 12 at the forward end of the housing 2 to accommodate the vertical swinging action of the clothes scale lever 22. The bottom flange portion 18 of part 12 is cut away on a bias, as shown at 13 in Fig. 2, to allow the clockwise pivoting of the housing 2 from the operative position shown in Fig. 2, as indicated by the curved arrow, to an inoperative position at right angles to such operative position.

Scale lever 22, which is narrow in horizontal section and wide in vertical section as indicated in Figs. 1 and 2, is provided on the rear end thereof with a somewhat vertically expanded portion at which the lever is pivotally supported on a horizontal axis and by means of which the lever is connected, by means to be described, to both the indicating mechanism and to the spring driving mechanism for the scale lever. Laterally projecting from the inner surface of part 12 of the housing is the pedestal 24, preferably formed integrally therewith, such pedestal having an outer portion 26 of reduced diameter which forms the pivot pin for the inner end of the lever 22. Such construction is more clearly shown in Fig. 5. Lever 22 is retained upon the pivot pin 26 by reason of the substantial engagement between the surface of such lever and the inner surface of the cover plate 14 which is attached to the flanges 16 and 18 of the housing by screws, in the manner shown in Fig. 5.

The inner end of lever 22 is provided, as shown in Fig. 3, with a partially annular slot 28 which lies above pivot pin 26 and is coaxial therewith. On the inner surface of slot 28 there is provided a gear segment 30. Gear 30 is constantly in mesh with the small pinion 32 which is keyed, as is more clearly shown in Fig. 5, on the outer end of the shaft 34. Shaft 34 extends through and is rotatably supported in a bore through the thickened side wall portion 36 of the housing part 12, as shown in Fig. 5. There is a circular well or depression on the outer face of wall portion 36, such well receiving the indicating disc 38 which is affixed to, and is preferably made integral with, the shaft 34 at its outer end. The outer surface of indicating disc 38 is provided with an indicating arrow 40, such arrow cooperating with the fixed indicating arrow 42 on the outer surface of housing part 12.

When the lever 22 is in its operative position and has no load thereon, it lies in the position shown in Figs. 1 and 3. The lever is stopped in such position by reason of the engagement between its upper surface and the terminal point 43 on the forward flange on housing portion 12. It will be apparent that rotation of lever 22 in a clockwise direction as the device is shown in Fig. 1, will result in the driving of indicating disc 38 in a counterclockwise direction. Means to be described are provided to oppose such clockwise rotation of lever 22 in such manner that the opposing force increases with the increasing torque imposed upon lever 22. Accordingly, when arrow 40 of disc 38 confronts the arrow 42, with the choice of suitable constants for the opposing force, there will be imposed on lever 22 a force corresponding to the calibrated maximum for which the scale is designed and set. The initial, no-load setting, of disc 38 may be varied by initial angular setting between pinion 32 and gear segment 30.

The opposing force on lever 22 is supplied by the following means. The end of lever 22 within housing 2 is provided on the surface remote from the cover plate 14 with a gear 44 coaxial with pivot pin 26. Gear 44 is fixedly attached to lever 22 and is preferably made integral therewith. Meshing with such gear 44 is a partial, larger, gear 46 which is pivotally mounted upon the pivot pin 48. Pin 48, as shown in Fig. 5, is formed as the outer end of reduced diameter of the pedestal 50 which protrudes from the inner surface of housing part 12. Gear 46 is maintained upon pin 48 by means of the pad 52 protruding from the inner face of the cover plate 14. Meshing with gear 46 at a point substantially diametrically opposite the point of engagement between gears 44 and 46 is a rack gear 54, gear 54 being affixed to the outer surface of a vertically reciprocable key member 56 protruding from the plunger 72. Plunger 72 will be more fully described hereinafter.

The rear end of the main housing member 12 of the scale is formed, in effect, as a tube, the tube as shown in Fig. 3 having a rear wall 58 and a forward wall 58'. Within the thus described tube is a pivot pin generally designated 60. Such pin, which connects housing 2 to bracket 4, has a head portion 62 and a stem portion 64 of reduced diameter. Preferably the stem portion 64 is made of a steel rod having a threaded or otherwise roughened upper end thereon, the portion 62 being of die-cast material which interlocks with the roughened upper end of stem 64. Part 62 is provided with an enlarged cap portion 66 which is of a diameter exceeding that of the lower portion of part 62 and that of the hole in the upper arm 8 of the bracket in which part 62 fits, so that member 60 may be inserted downwardly within the tube, being prevented from falling therethrough by engagement between the cap 66 and the upper surface of arm 8. Pivot pin 60 is prevented from rotation with respect to the bracket 4 by reason of a radial key member 68 protruding from part 62 beneath the cap 66, key member 68 fitting within a complementary key-way in the opening through arm 8 which receives part 62, as shown in Fig. 3. After assembly of the pivot pin and of the spring and spring seat washer, to be described, in the tubular rear end of the housing, the pivot pin is headed at the lower end, as shown at 70, to prevent its axial withdrawal.

Slidably fitting within the bore 59 through the tubular portion of the rear end of the housing in the lower end thereof is the vertically reciprocable plunger 72. Member 72 at its upper portion snugly and slidably fits about the stem member 64 and is provided at its medial and lower end portions with a counterbore 74. Contained within the counterbore and bearing against the upper end thereof is a coil compression spring 76 which constantly urges plunger 72 in an upward direction. The lower end of spring 76 rests upon a spring seat providing washer member 78, member 78 resting upon the upper surface of arm 10 of the bracket and being restrained from rotation with respect to the housing 12 by the radial key member 80 on the washer. Key member 80 fits within the vertical slot 82 through wall 58' of the tubular rear end of the housing, the above described key member 56 on plunger 72 reciprocating in such slot. Considering Fig. 3 particularly, it will be seen that when a load is imposed upon scale arm 22, thus rotating the arm counterclockwise about its pivotal point as the device is shown in Fig. 3, the gear 46, as a result, will be rotated clockwise. Such clockwise rotation of gear 46 drives the rack gear 54 downwardly, carrying with it the plunger member 72 and thus progressively compressing the spring 76. It will be appreciated that the rotation of indicating disc 38 will thus bear a straight-line relationship with the amount of torque imposed upon lever 22 and thus the amount of clothes or other materials hung upon such lever. It will be appreciated that spring 76 will be chosen in each instance, to have compression characteristics such that the scale will operate within a predetermined load range, examples of such ranges being 6-7 pounds, 7-8 pounds, 8-9 pounds, etc.

Because clothing will in the main be hung upon the lever in the same manner, time after time, no localized point of hanging of the clothes on the lever is usually necessary. Calibration of the scale will be effected after a large number of tests of the random disposal of clothing upon the scale lever, and thus the reading of the scale in operation will be accurate within a close enough tolerance for the purpose in hand. If, however, it is desired to make the scale more accurate, it is necessary only to hang a clothes suspending means from one fixed point on the outer end of lever 22, as from a hole drilled through the scale lever 22, as indicated at 83 in Fig. 1.

As above indicated, the main housing portion 2 of the scale may be swung from the operative position shown in Figs. 1 and 2 to a position in which the housing, and consequently the lever 22, will occupy a position vertical of the paper as the device is shown in Fig. 2. In the preferred embodiment, means is provided to hold main body 2 stably in either of such two positions. Such means takes the form of a projection 84 on the bottom of the spring seat washer 78, such projection cooperating with the two partially spherical depressions 86 and 88 on the upper surface of the arm 10 of the bracket 4. It will be seen that spring seat washer 78 is constantly pressed downward by reason of the action of spring 76. Thus, when the projection 84 is engaged in either of depressions 86 or 88 the housing 2 is held stably in either the operative or the inoperative position. The depth of depressions 86 and 88 is not such, however, as to prevent the swinging of the housing 8 by the application of a reasonably moderate force thereto.

In the embodiment of the clothes scale shown, there is incorporated in the pivoting means for the housing a further means whereby, when the housing 2 is swung from the operative position shown in Fig. 2 to the inoperative position at right angles thereto, above described, the scale lever 22 is automatically lowered into a vertical position, in which it lies close to the supporting surface such as the wall of the washing machine. Such last named means, that is, the automatic scale lever lowering means, in the illustrative embodiment is incorporated in the mating surfaces of the parts 62 and 72, which are more clearly shown in Fig. 4. As can be seen in Fig. 4, part 62 is provided with a toothed lower end 90, and plunger 72 is provided with a toothed upper end 92 complementary to the end 90. In the embodiment shown, two diametrically opposed teeth are provided on both ends 90 and 92, one such point on end 90 being designated 94. Tooth 94 has a vertical surface 96 lying parallel to the axis of members 60 and 72, the teeth on end 92, of which one is shown at 98, having similar vertical surfaces, that on tooth 98 being designated 100. Leading up to the teeth, in a direction toward the vertical surfaces thereon, are inclined surfaces, that on end 90 leading up to surface 96 being designated 102 and that on end 92 leading up to vertical surface 100 being designated 104. Head portion 62 of the pivot pin 60 is keyed to the bracket 4 as described. With the plunger 72, which is held from rotation about its axis by reason of the engagement between the key member 56 and the slot 82, in the operative position shown in Fig. 3 the vertical surfaces of the teeth, that is surface 96 on part 62 and surface 100 on part 72 are in confronting relationship, with the peak of the teeth on one part substantially in contact with the valleys of the teeth on the other part. It will be apparent that, with the parts 62 and 72 in such relationship, the plunger 72 is permitted to slide freely vertically downward with respect to part 62.

When the housing is pivoted into inoperative position parallel with the supporting surface for the scale, it rotates in a direction toward the reader in Fig. 3. Thereupon the peaks of the teeth and the inclined surfaces leading up to the peaks of the teeth on plunger 72 ride down the complementary inclined surfaces leading to the valleys of the teeth on part 62, and the plunger 72 is thus driven downwardly. Such downward driving of the plunger results in the clockwise rotation of gear 46 and the counterclockwise rotation of gear 44, as the device is shown in Fig. 3, thereupon positively driving the scale lever 22 counterclockwise into the inoperative, vertical, position in which it lies close to the supporting surface for the scale.

Although for purposes of illustration I have shown and described a preferred embodiment of the scale of the invention and have indicated a preferred application of the same, that is, for the weighing of clothes, it will be understood that the scale, within the scope of the invention, is capable of considerable variation as to details of construction and that it is capable of use to advantage in numerous applications. The invention is, therefore, defined by the scope of the claims appended hereto.

I claim as new the following:

1. A weighing device comprising a main housing, a housing supporting bracket adapted to be attached to a vertical supporting member, means to connect the housing and bracket so that the housing may be pivoted with respect to the bracket on a vertical axis from an operative position in which it projects substantially at right angles to the supporting member to an inoperative position in which it lies parallel to the supporting member, a load receiving scale lever pivoted in the housing, a pivot pin on the housing mounting the inner end of the scale lever, said scale lever having an outer arm projecting from the housing, the outer end of the scale lever lying substantially horizontal, an indicating means connected to the scale lever to indicate the amount of deflection of the lever, means within the housing comprising a plunger and a spring thrusting such plunger to coact with the scale lever yieldingly to oppose said deflection of the scale lever, cooperating cam members on the housing and plunger, respectively, operative to thrust the plunger in a direction to retract the plunger against the action of its spring when the housing is pivoted with respect to the bracket to lie parallel to the supporting member, whereby when the housing is so pivoted the scale lever is thrust into a vertical, inoperative, position.

2. A weighing device comprising a main housing, a housing supporting bracket adapted to be attached to a vertical supporting member, means to connect the housing and bracket so that the housing may be pivoted on a vertical axis, with respect to the bracket, from an operative position in which it projects substantially at right angles to the supporting member to an inoperative position in which it lies parallel to the supporting member, said last named means comprising a vertical pivot pin attached to the bracket and projecting into the rear end of the housing, a load receiving scale lever pivoted in the housing, a pivot pin on the housing mounting the inner end of the scale lever, said scale lever having an outer arm projecting substantially horizontally from the forward end of the housing, a motion multiplying indicating means connected to the scale lever adjacent the pivot pin therefor to indicate the amount of deflection of the lever, means within the housing coacting with the scale lever yieldingly to oppose said deflection of the scale lever, said last named means comprising a plunger mounted in the housing about the pivot pin connecting the housing and bracket, said plunger being slidable in a vertical direction, a coil spring constantly urging the plunger upwardly, gearing connecting the plunger to the scale lever, and means automatically to thrust the scale lever into a vertical, inoperative, position in which it depends from the housing when the housing is pivoted with respect to the bracket to lie parallel to the supporting member, said last named means comprising a toothed upper end on the plunger, at least one tooth on the plunger, said tooth having one side thereof straight and lying parallel to the axis of the plunger, the other side of said tooth being in the form of an inclined surface rising to the peak of said tooth, the bracket having mounted thereon a projection coacting with the toothed upper end of the plunger, the lower end of said projection having a tooth thereon which mates with and is complementary to the tooth on the plunger, the plunger and projection being so oriented that the straight sides of the mating teeth are parallel to each other when the housing is at right angles to the supporting member.

3. A weighing device comprising a main housing, a housing supporting bracket adapted to be attached to a vertical supporting member, means to connect the housing and bracket so that the housing may be pivoted on a vertical axis, with respect to the bracket, from an operative position in which it projects substantially at right angles to the supporting member to an inoperative position in which it lies parallel to the supporting member, said last named means comprising a vertical pivot pin attached to the bracket and projecting through the rear end of the housing, a load receiving scale lever pivoted in the housing, a pivot pin on the housing mounting the inner end of the scale lever, said scale lever having an outer arm projecting substantially horizontally from the forward end of the housing, a motion multiplying indicating means connected to the scale lever adjacent the pivot pin therefor to indicate the amount of deflection of the lever, means within the housing coacting with the scale lever yieldingly to oppose said deflection of the scale lever, said last named means comprising a plunger mounted in the housing about the pivot pin connecting the housing and bracket, said plunger being slidable in a vertical direction, a coil spring constantly urging the plunger upwardly, a rack on the plunger, a first circular gear coaxial with the pivot pin for the scale lever fixedly mounted on the lever, and a second circular gear mounted on an axis parallel to the pivot pin for the scale lever, said second circular gear meshing with the first circular gear and with the rack on the plunger, and means automatically to thrust the scale lever into a vertical, inoperative, position in which it depends from the housing when the housing is pivoted with respect to the bracket to lie parallel to the supporting member, said last named means comprising a toothed upper end on the plunger, a plurality of angularly spaced teeth on the plunger, said teeth having the same one side of each straight and lying parallel to the axis of the plunger, the other side of each of said teeth being in the form of an inclined surface rising to the peak of said tooth, the bracket having mounted thereon a vertical projection coacting with the toothed upper end of the plunger, the lower end of said projection having teeth thereon which mate with and are complementary to the teeth on the plunger, the plunger and projection being so oriented that the straight sides of the mating teeth are parallel to each other when the housing is at right angles to the supporting member.

4. A weighing device comprising a main housing, a housing supporting bracket adapted to be attached to a vertical supporting member, means to connect the housing and bracket so that the housing may be pivoted with respect to the bracket on a vertical axis from an operative position in which it projects substantially at right angles to the supporting member to an inoperative position in which it lies parallel to the supporting member, a load receiving scale lever pivoted in the housing, a pivot pin on the housing mounting the inner end of the scale lever, said scale lever having an outer arm projecting from the housing, the outer end of the scale lever lying substantially horizontal, an indicating means connected to the scale lever to indicate the amount of deflection of the lever, resilient load sustaining means within the housing, means connecting the load sustaining means to the scale lever so that the load sustaining means opposes deflection of the scale lever, and means operative upon such connecting means to thrust the scale lever into a vertical, inoperative, position when the housing is pivoted with respect to the bracket to lie parallel to the sustaining member.

5. A weighing device comprising a main housing, a housing supporting bracket adapted to be attached to a vertical supporting member, means to connect the housing and bracket so that the housing may be pivoted with respect to the bracket on a vertical axis from an operative position in which it projects substantially at right angles to the supporting member to an inoperative position in which it lies parallel to the supporting member, a load receiving scale lever pivoted in the housing, a pivot pin on the housing mounting the inner end of the scale lever, said scale lever having an outer arm projecting from the housing, the outer end of the scale lever lying substantially horizontal, an indicating means connected to the scale lever to indicate the amount of deflection of the lever, resilient load sustaining means within the housing, means connecting the load sustaining means to the scale lever so that the load sustaining means opposes deflection of the scale lever, a first cam fixed with respect to the bracket, and a second cam affixed to the connecting means and cooperating with the first cam to cause the scale lever to be thrust into a vertical, inoperative, position when the housing is pivoted with respect to the bracket to lie parallel to the supporting member.

HENRY F. HOWARD.

REFERENCES CITED

The following references are of record in the file of this patent:

UNITED STATES PATENTS

| Number | Name | Date |
|---|---|---|
| 282,645 | Kingwell | Aug. 7, 1883 |
| 371,920 | Both | Oct. 25, 1887 |
| 1,190,632 | Collette | July 11, 1916 |
| 1,930,606 | Bousfield | Oct. 17, 1933 |
| 2,003,737 | Butler | June 4, 1935 |
| 2,039,528 | Garbell | May 5, 1936 |
| 2,139,634 | Heigis | Dec. 6, 1938 |
| 2,354,390 | Lowy | July 25, 1944 |
| 2,412,270 | Johnston | Dec. 10, 1946 |

FOREIGN PATENTS

| Number | Country | Date |
|---|---|---|
| 619,713 | Germany | Oct. 5, 1935 |
| 621,943 | Germany | Nov. 15, 1935 |